(12) United States Patent
Kim et al.

(10) Patent No.: US 11,385,595 B2
(45) Date of Patent: Jul. 12, 2022

(54) REFRACTIVE OPTICAL SCREEN AND FLOATING HOLOGRAM SYSTEM USING SAME

(71) Applicant: KT CORPORATION, Gyeonggi-do (KR)

(72) Inventors: Jong-Heum Kim, Gyeonggi-do (KR); Jang-Won Suh, Gyeonggi-do (KR); Tae-Gil Yang, Seoul (KR); Sang-Hoon Han, Gyeonggi-do (KR)

(73) Assignee: KT CORPORATION, Gyeonggi-do (KR)

( * ) Notice: Subject to any disclaimer, the term of this patent is extended or adjusted under 35 U.S.C. 154(b) by 298 days.

(21) Appl. No.: 16/343,751

(22) PCT Filed: Oct. 19, 2016

(86) PCT No.: PCT/KR2016/011750
§ 371 (c)(1),
(2) Date: Apr. 19, 2019

(87) PCT Pub. No.: WO2018/074623
PCT Pub. Date: Apr. 26, 2018

(65) Prior Publication Data
US 2019/0286054 A1 Sep. 19, 2019

(51) Int. Cl.
*G03H 1/22* (2006.01)
*G03H 1/08* (2006.01)
*G03H 1/04* (2006.01)

(52) U.S. Cl.
CPC ............ *G03H 1/2205* (2013.01); *G03H 1/04* (2013.01); *G03H 1/08* (2013.01); *G03H 1/22* (2013.01);
(Continued)

(58) Field of Classification Search
CPC .......... G03H 1/2205; G03H 1/08; G03H 1/22; G03H 1/04; G03H 2001/2231;
(Continued)

(56) References Cited

U.S. PATENT DOCUMENTS

2007/0064294 A1  3/2007  Hoshino et al.
2010/0027083 A1  2/2010  Kroll et al.
(Continued)

FOREIGN PATENT DOCUMENTS

JP   2001-264884 A   9/2001
JP   2007-010776 A   1/2007
(Continued)

OTHER PUBLICATIONS

Korean Intellectual Property Office, International Search Report of International Application No. PCT/KR2016/011750, dated Jul. 18, 2017.

*Primary Examiner* — Kimberly N. Kakalec
(74) *Attorney, Agent, or Firm* — IP Legal Services, LLC

(57) ABSTRACT

Disclosed are a refractive optical screen and a floating hologram system using the same. The refractive optical screen is a refractive optical screen which refracts incident light beams and adjusts a travelling direction of the light beams, and includes a prism array in which a plurality of prisms refracting one or more light beams toward a viewing direction of a viewer located at the front side of the refractive optical screen is arranged in a line, and one or more virtual images generated by the one or more refracted light beams simultaneously form a floating hologram arranged in the viewing direction.

11 Claims, 20 Drawing Sheets

(52) U.S. Cl.
CPC ............... *G03H 2001/2231* (2013.01); *G03H 2001/2236* (2013.01); *G03H 2222/34* (2013.01); *G03H 2223/18* (2013.01); *G03H 2223/24* (2013.01)

(58) Field of Classification Search
CPC ....... G03H 2001/2236; G03H 2222/34; G03H 2223/18; G03H 2223/24; G03H 2001/2218; G03B 21/10; G03B 21/28; G03B 21/625; G03B 21/00; G02B 5/124; G02B 27/126; G02B 30/60; G02B 30/36; G02B 5/045
See application file for complete search history.

(56) References Cited

U.S. PATENT DOCUMENTS

| | | | |
|---|---|---|---|
| 2010/0046049 A1 | 2/2010 | Kroll et al. | |
| 2010/0046050 A1 | 2/2010 | Kroll et al. | |
| 2010/0097439 A1 | 4/2010 | Kroll et al. | |
| 2010/0103485 A1 | 4/2010 | Haussler | |
| 2010/0118117 A1 | 5/2010 | Kroll et al. | |
| 2010/0149139 A1 | 6/2010 | Kroll et al. | |
| 2010/0149311 A1 | 6/2010 | Kroll et al. | |
| 2010/0149312 A1 | 6/2010 | Sehwerdtner | |
| 2010/0149314 A1 | 6/2010 | Sehwerdtner et al. | |
| 2010/0149609 A1 | 6/2010 | Sehwerdtner | |
| 2010/0149610 A1 | 6/2010 | Schwerdtner et al. | |
| 2010/0157399 A1 | 6/2010 | Kroll et al. | |
| 2010/0194854 A1 | 8/2010 | Kroll et al. | |
| 2010/0214634 A1 | 8/2010 | Kroll et al. | |
| 2010/0253677 A1 | 10/2010 | Kroll et al. | |
| 2011/0149018 A1 | 6/2011 | Kroll et al. | |
| 2013/0250049 A1 | 9/2013 | Sehwerdtner | |
| 2014/0362438 A1 | 12/2014 | Kim et al. | |
| 2015/0085088 A1 | 3/2015 | Asai | |
| 2015/0160614 A1 | 6/2015 | Sung et al. | |
| 2015/0323899 A1 | 11/2015 | Sehwerdtner | |
| 2016/0291544 A1 | 10/2016 | Kroll et al. | |
| 2017/0153600 A1 | 6/2017 | Sehwerdtner | |
| 2018/0040281 A1* | 2/2018 | Liu | G02B 5/0231 |
| 2018/0217554 A1 | 8/2018 | Kroll et al. | |

FOREIGN PATENT DOCUMENTS

| | | |
|---|---|---|
| JP | 2012-048002 A | 3/2012 |
| JP | 2012-230310 A | 11/2012 |
| JP | 2014-119607 A | 6/2014 |
| JP | 2015-084079 A | 4/2015 |
| KR | 20-0314445 Y1 | 5/2003 |
| KR | 10-0787264 B1 | 12/2007 |
| KR | 10-2014-0144617 A | 12/2014 |
| KR | 10-1505485 B1 | 3/2015 |
| KR | 10-2015-0066183 A | 6/2015 |
| KR | 20160019193 A * | 2/2016 |
| KR | 10-2017-0039526 A | 4/2017 |

* cited by examiner

REFRACTIVE OPTICAL SCREEN AND FLOATING HOLOGRAM SYSTEM USING SAME

CROSS REFERENCE TO RELATED APPLICATIONS

This application is a National Stage Patent Application of PCT International Patent Application No. PCT/KR2016/011750 (filed on Oct. 19, 2016) under 35 U.S.C. § 371, the teaching of which is incorporated herein in its entirety by reference.

TECHNICAL FIELD

The present invention relates to a refractive optical screen, and a floating hologram system using the same.

BACKGROUND ART

Holography means a technology of recording and reproducing three-dimensional information by using a light interference phenomenon generated when two laser beams meet. A hologram is a word created by combining "holo" meaning "perfectness" or "whole" and "gram" meaning a "message" or "information". The hologram is being studied as a next-generation imaging technology because the hologram provides a 3D effect that look like a real object.

However, in order to record, reproduce, and display a hologram, a small optical device enough to cause diffraction and interference of light and data processing capability are required, so that it is considered to take a long time to commercialize the hologram.

Recently, a hologram theater for directing as if an actual person appears and performs on the stage by using an optical illusion effect known as "Pepper's ghost" has been created.

In general, every medium has reflectivity and transmittance, and "Pepper's ghost" means a technique for enabling a person to view transmitted light of a rear surface of a material and reflected light of a front surface of the material at the same time by gloss coating a material, such as polyethylene terephthalate (PET), having high light transmittance so as to increase reflectivity, and providing an effect as if an image of the front surface of the material coexists on a background and a space behind.

To this end, the material is installed in a plane form inclined by 45° with respect to a floor screen, and a floor image is formed as a virtual image at a position symmetric based on a reflecting material according to a light reflection law, so that an audience may have the same effect as if the floor image exists on the stage when the audience views the image.

The technique provides an effect of floating objects (virtual images) in a space, thereby being called "floating hologram" as one scheme of a pseudo hologram. The technique has been already widely known, and is currently widely used in offline performances, musicals, and the like, so that a particular matter thereof will not be mentioned.

In the technique, transmission of background light and reflection of a floor image needs to be simultaneously performed, so that in order to obtain a clear hologram image, a projector of high ANSI lumen needs to be used in consideration of reflectivity, and light intensity of a reflected image is not high, so that interference of ambient light needs to be minimal. Accordingly, a theater has a limit in view that the theater is generally a dark room environment similar to a movie theater.

Currently, in a generally used floating hologram scheme, a transparent reflective film is placed at an angle of 45°, so that it is directed so that a floor image is reflected forward and is displayed so as to be seen together with a transmitted background object.

However, since the transmission of background light and the reflection of the floor image need to be simultaneously performed through one film, so that the amount of reflected light is small, there is a limitation in that the floating hologram needs to be used in a dark space so as to prevent interference of ambient light.

DISCLOSURE

Technical Problem

Accordingly, the technical object to be achieved by the present invention is to provide a refractive optical screen for forming one or more virtual images in a hologram space so as to provide a floating hologram effect as if two or more different images exist in one physical space by using a refraction property of light, and a floating hologram system using the same.

Technical Solution

An exemplary embodiment of the present invention provides a refractive optical screen which refracts incident light beams and adjusts a travelling direction of the light beams, the refractive optical screen including: a prism array in which a plurality of prisms for refracting one or more light beams toward a viewing direction of a viewer located at a front side of the refractive optical screen is arranged in a line, in which one or more virtual images formed by the one or more refracted light beams exist in one space to form a floating hologram.

In the prism array, the plurality of prisms, which refracts first light beams incident in a first direction toward the viewing direction and refracts second light beams incident in a second direction different from the first direction toward the viewing direction, may be continuously arranged in a line.

In the prism array, a plurality of micro trigonal prisms may be arranged in a vertical direction to the viewing direction in a line without having a gap.

In the prism array, a plurality of prisms for refracting first light beams incident in a first direction toward the viewing direction may be arranged in a line while being spaced apart from each other by a predetermined gap, and second light beams incident in a different direction from that of the first light beams may straightly pass through the gap.

In the prism array, a plurality of micro trigonal prisms may be regularly arranged in a vertical direction to the viewing direction while having the predetermined gap.

In the prism array, a plurality of micro trigonal prisms having different sizes and angles in consideration of a viewing angle of a viewer may be regularly arranged in a vertical direction to the viewing direction.

The prism array may include a plurality of trigonal prisms having different apex angles so as to have the same incident angle, and the same incident angle may be set by using an angle (ri) between a segment of a line connecting a visual field of the viewer and an apex of each prism and a reference horizontal surface, an upper apex angle (ai) of each prism, and a light beam passing ratio (a) between a first facet disposed at an upper portion of each prism and a second facet disposed in a lower end of the prism.

The prism array may include a plurality of micro trigonal prisms having a prism size according to a pitch size calculated by using Cycles Per Degree (CPD) based on a Human Visual System (HVS) that is a value representing a human retina limit.

The prism array may include a plurality of first prisms which refracts first light beams incident in a first direction toward the viewing direction, and a plurality of second prisms which refracts second light beams incident in a different direction from the first direction toward the viewing direction, and the plurality of first prisms and the plurality of second prisms may be arranged in a line while being spaced apart from each other by a predetermined gap, and third light beams incident in a different direction from those of the second light beams and the first light beams may straightly pass through the gap.

The plurality of first prisms may be a micro trigonal prism having the same angle and size, the plurality of second prisms may be a micro trigonal prism having a shape symmetric to a shape of the plurality of first prisms and having a predetermined angle and size, and in the prism array, the plurality of first prisms and the plurality of second prisms may be regularly arranged in a structure symmetric based on a center of the viewing direction in a vertical direction to the viewing direction while having the same gap.

Another exemplary embodiment of the present invention provides a floating hologram system, including: a projector 1 which outputs a first image; a projector 2 which outputs a second image; a reflective screen 1 which is located in a direction diagonal to the projector 1 and reflects the first image; a reflective screen 2 which is located in a direction diagonal to the projector 2 and reflects the second image; and a refractive optical screen which is disposed at a location facing a viewing direction of a viewer, and refracts a plurality of first light beams toward the viewing direction when the plurality of first light beams reflected from the reflective screen 1 is incident, and refracts a plurality of second light beams toward the viewing direction when the plurality of second light beams reflected from the reflective screen 2 is incident, in which the plurality of refracted first light beams forms a first virtual image in a hologram space, and the plurality of refracted second light beams forms a second virtual image in a hologram space.

The refractive optical screen may include a prism array in which a plurality of prisms including a first facet that is an optical plane refracting the first light beams toward the viewing direction and a second facet that is an optical plane refracting the second light beams incident in a different direction from a direction of the first light beams toward the viewing direction are continuously arranged in a vertical direction to the viewing direction in a line.

The projector 1 and the reflective screen 2 may be located in an upper portion of the hologram space, and the projector 2 and the reflective screen 1 may be located in a lower portion of the hologram space, and a floating hologram image, in which the second virtual image is a front image and the first virtual image is a rear image, may be output in the hologram space.

Image points of an image reflected from each of the reflective screen 1 and the reflective screen 2 may form virtual image points on an extension line having the same length with respect to a refractive surface of a prism, respectively, and positions and angles of the virtual image points may be changed according to an installation location and angle of each of the reflective screen 1 and the reflective screen 2.

Still another exemplary embodiment of the present invention provides a floating hologram system, including: a projector which outputs a first image; a reflective screen which is located in a direction diagonal to the projector and reflects the first image; a stage, on which an actual object is located; and a refractive optical screen, which is disposed at a location facing a viewing direction of a viewer, and refracts a plurality of first light beams toward the viewing direction when the plurality of first light beams reflected from the reflective screen is incident, and allows a plurality of second light beams generated by the real object to straightly pass through toward the viewing direction, in which the plurality of refracted first light beams forms a virtual image in a hologram space, and the first virtual image and a real object image using the second light beams are formed together in the hologram space.

In the refractive optical screen, a plurality of prisms refracting the first light beams may be regularly arranged in a vertical direction to the viewing direction while being spaced apart from each other by a predetermined gap, and the second light beams may straightly pass through the gap.

The projector 1 may be located in an upper portion of the hologram space, the stage and the reflective screen may be located in a lower portion of the hologram space, and in the hologram space, a floating hologram image, in which the first virtual image is a front image and the real object image is a rear image, may be generated.

Yet another exemplary embodiment of the present invention provides a floating hologram system, including: a projector 1 which outputs a first image; a projector 2 which outputs a second image; a reflective screen 1 which is located in a direction diagonal to the projector 1 and reflects the first image; a reflective screen 2 which is located in a direction diagonal to the projector 2 and reflects the second image; a stage, on which an actual object is located; and a refractive optical screen, which is disposed at a location facing a viewing direction of a viewer, and refracts a plurality of first light beams toward the viewing direction when the plurality of first light beams reflected from the reflective screen 1 is incident, refracts a plurality of second light beams toward the viewing direction when the plurality of second light beams reflected from the reflective screen 2 is incident, and allows a plurality of third light beams generated by the real object to straightly pass through toward the viewing direction, in which the plurality of refracted first light beams forms a first virtual image in a hologram space, the plurality of refracted second light beams forms a second virtual image in the hologram space, and the first virtual image, the second virtual image, and the real object image using the third light beams are formed together in the hologram space.

The refractive optical screen may include a plurality of first prisms which refracts the first light beams incident in a first direction toward the viewing direction, and a plurality of second prisms which refracts the second light beams incident in a second direction different from the first direction toward the viewing direction, and the plurality of first prisms and the plurality of second prisms may be arranged in a vertical direction to the viewing direction in a line in a symmetric structure while being spaced apart from each other by a predetermined gap, and the third light beams incident in a different direction from the directions of the first light beams and the second light beams may straightly pass through the gap.

The projector 1 and the reflective screen 2 may be located in an upper portion of the hologram space, the projector 2 and the reflective screen 1 may be located in a lower portion of the hologram space, and the stage may be located behind the projector 1 and the projector 2, and in the hologram space, a floating hologram image, in which the first virtual image is an upper front image, the second virtual image is a lower front image, and the real object image is a rear image, may be formed.

Advantageous Effects

According to the exemplary embodiments of the present invention, unlike the use of only a light reflection property in the related art, images of two different real objects or displays are refracted through the refractive optical screen to allow light to travel, so that the images are displayed as if a plurality of virtual images exists in one space, thereby providing a floating hologram effect as if a real person appears in front of the eye.

In addition, the small refractive optical screen formed of the micro prism array is utilized, and it is possible to express virtual images as if two images exist together in one space by refracting travelling light of two different images existing in a space.

In addition, it is possible to provide a floating hologram effect by applying a method of dividing images into a front image and a rear image.

MODE FOR INVENTION

Figure 1:
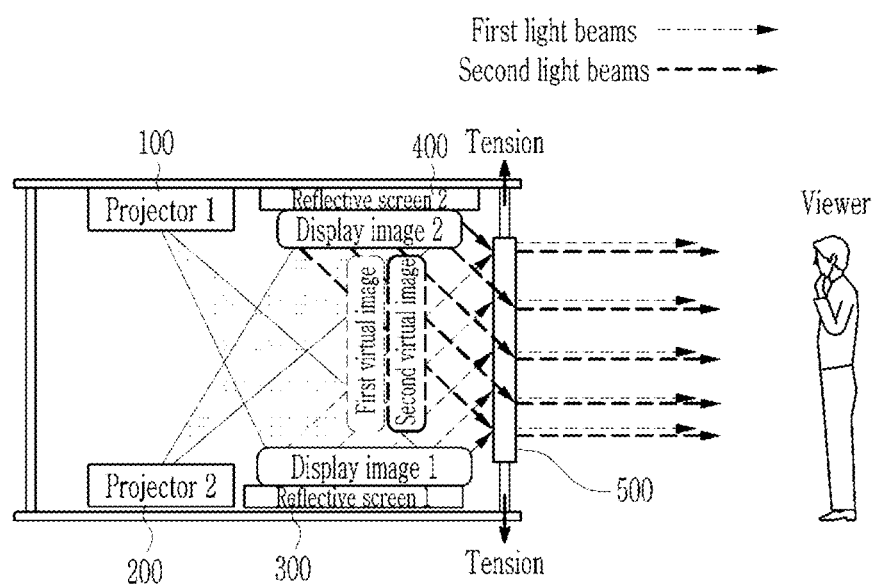
FIG. 1 is a diagram illustrating a floating hologram system according to an exemplary embodiment of the present invention.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Throughout the specification, unless explicitly described to the contrary, the word "comprise" and variations such as "comprises" or "comprising", will be understood to imply the inclusion of stated elements but not the exclusion of any other elements.

In addition, the terms unit", module", and the like described in the specification mean units for processing at least one function and operation and can be implemented by hardware components or software components and combinations thereof.

Hereinafter, a refractive optical screen according to an exemplary embodiment of the present invention and a floating hologram system using the same will be described in detail with reference to the drawings.

FIG. 1 is a diagram illustrating a floating hologram system according to an exemplary embodiment of the present invention.

Referring to FIG. 1, in a floating hologram system, an actual image or a display image is refracted to be viewed in a direction of a viewer.

The floating hologram system includes a projector 1 100, a projector 2 200, a reflective screen 1 300, a reflective screen 2 400, and a refractive optical screen 500.

The projector 1 100 is located in an upper portion based on a floating hologram space, in which a first virtual image and a second virtual image are formed. The projector 1 100 outputs a display image 1 toward the reflective screen 1 300.

The projector 2 200 is located in a lower portion based on the hologram space. The projector 2 200 outputs a display image 2 toward the reflective screen 2 400.

The reflective screen 1 300 is located in a lower portion based on the floating hologram space in a direction diagonal to the projector 1 100. The reflective screen 1 300 reflects the display image 1 output by the projector 1 100.

The reflective screen 2 400 is located in an upper portion based on the floating hologram space in a direction diagonal to the projector 2 200. The reflective screen 2 400 reflects the display image 2 output by the projector 2 200.

In this case, the reflective screen 1 300 and the reflective screen 2 400 are implemented to be vertically disposed to the refractive optical screen 500, but may also be installed in a diagonal direction or in the form inclined at a predetermined angle in consideration of a position of a virtual image and the like, and the disposition of the reflective screen 1 300 and the reflective screen 2 400 may be different according to a refraction angle provided by the refractive optical screen 500.

In addition, the reflective screens 300 and 400 are display screens. The projector 1 100, the projector 2 200, and the reflective screens 300 and 400 may be replaced with an LCD display or an LED display. That is, the projector 1 100, the projector 2 200, and the reflective screens 300 and 400 may also be implemented as an image display device, not separate configurations. In addition, the present invention does not essentially include a display device, and may also be implemented with an actual object image and the refractive optical screen 500.

The refractive optical screen 500 refracts incident light beams and adjusts a travelling direction of the light beams.

The refractive optical screen 500 is disposed at a position facing a viewing direction of a viewer.

The refractive optical screen 500 is installed to be tensioned and maintained in a vertical plane form so that the first virtual image and the second virtual image are well formed and are not distorted.

The refractive optical screen 500 includes a prism array in which a plurality of prisms refracting one or more light beams toward a viewing direction of a viewer located at the front side of the refractive optical screen 500 is arranged in a line. Further, one or more virtual images generated by the one or more refracted light beams simultaneously form a floating hologram arranged in the viewing direction.

A prism has a property of refracting parallel incident light at a predetermined angle and allowing the light to travel. Further, the prism has a shape of a triangular column, so that the prism may be manufactured so as to allow two different light to pass the prism and travel in the same direction.

Herein, when a plurality of first light beams reflected from the reflective screen 1 300 is incident, the refractive optical screen 500 refracts the plurality of incident first light beams toward the viewing direction of the viewer or toward the front side of the refractive optical screen 500. Further, when a plurality of second light beams reflected from the reflective screen 2 400 is incident, the refractive optical screen 500 refracts the plurality of incident second light beams toward the viewing direction of the viewer or toward the front side of the refractive optical screen 500.

A floating hologram image is formed in a floating hologram space so that the viewer views the first virtual image using the plurality of first light beams that is refracted to the front side and the second virtual image using the plurality of second light beams that is refracted to the front side together in one space.

Herein, in the floating hologram space, the floating hologram image, in which the first virtual image is a rear image and the second virtual image is a front image, is formed. However, as the exemplary embodiment, it is described that the first virtual image is the rear image and the second virtual image is the front image, but an opposite case may be used in actuality.

Positions, angles, and sizes of the first virtual image and the second virtual image may be adjusted according to positions/sizes/angles of the display images formed in the reflective screens 300 and 400, and an apex angle, that is, a refraction angle of a unit prism configuring a prism sheet or the refractive optical screen 500.

Herein, the prism sheet is the refractive optical screen 500 formed of a set of individual prisms, that is, the prism array, and may be manufactured to be thin in the form of a film and be rolled for storage/transfer, or may be manufactured in the form of a panel (plate) and be used by bonding unit channels.

As described above, according to FIG. 1, the viewer views the images as if the first image output by the projector 1 100 is output at a point at which the first virtual image is located and the second image output by the projector 2 200 is output at a point at which the second virtual image is located.

Figure 2:
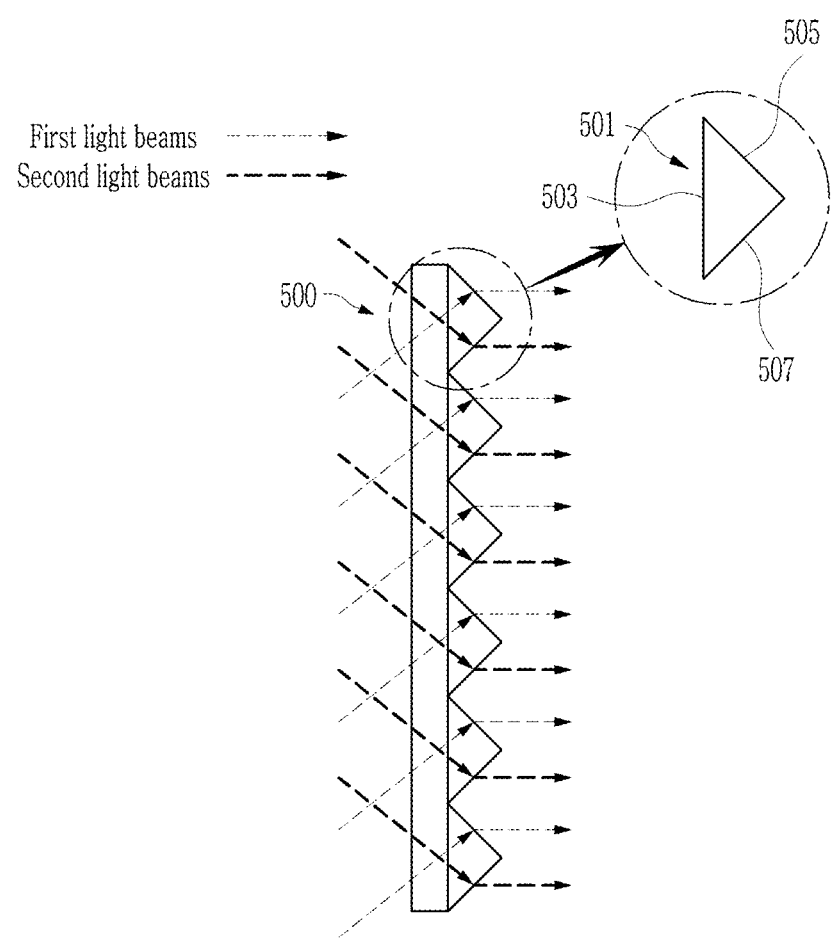
FIG. 2 is a diagram illustrating a detailed configuration of a refractive optical screen of FIG. 1.

FIG. 2 is a diagram illustrating a detailed configuration of a refractive optical screen of FIG. 1.

Referring to FIG. 2, the refractive optical screen 500 is formed of the prism array in which the plurality of prisms 501 refracting a first light beam incident in a first direction and refracting a second light beam incident in a second direction different from the first direction toward a viewing direction is continuously arranged in a line. In the prism array, the plurality of prisms 501 is continuously arranged in a line without having a gap.

In this case, the plurality of prisms 501 is arranged in a direction vertical to the viewing direction of the viewer. Herein, the prism array may be formed of a micro prism array in which a plurality of micro trigonal prisms having the same apex angle and size is repeatedly arranged in a line in a direction vertical to the viewing direction without having a gap.

Further, the prism may be the prism having a uniform apex angle, but the prism may also be implemented in a non-uniform scheme, in which an apex angle is changed according to a position of the prism array, that is, a position of a corresponding prism in the prism sheet 500. This will be described with reference to FIG. 19.

Each of the plurality of prisms 501 includes an incident surface 503 that is an optical plane to which light beams are incident, a first facet 505 that is an optical plane refracting the first light beams incident from a lower end, and a second facet 507 that is an optical plane refracting the second light beams incident from a different direction from that of the first light beams, that is, an upper end.

In this case, the first facet 505 and the second facet 507 are not parallel to each other. Further, the refracted first light beams and the refracted second light beams of the first light beams and the second light beams that are incident in parallel may travel in parallel in the viewing direction of the viewer. However, the present invention is not limited to the foregoing contents, and may also be implemented in another exemplary embodiment.

Figure 3:
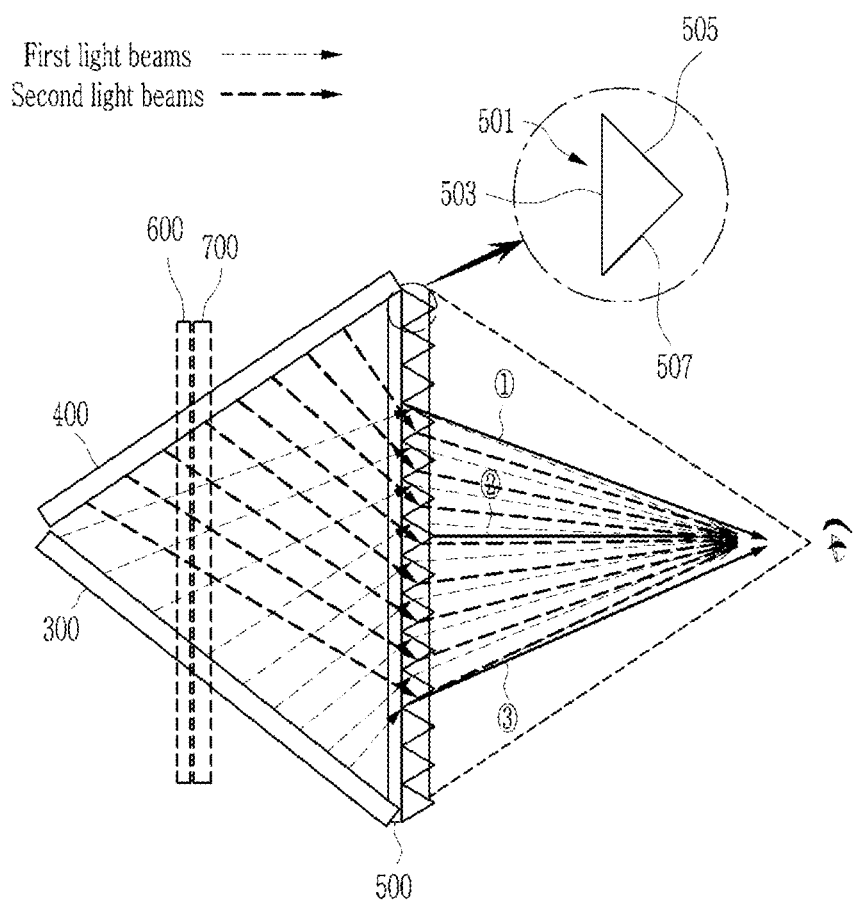
FIG. 3 is a diagram for describing an operation of generating a floating hologram of the refractive optical screen according to the exemplary embodiment of the present invention.

FIG. 3 is a diagram for describing an operation of generating a floating hologram of the refractive optical screen according to the exemplary embodiment of the present invention.

Referring to FIG. 3, the plurality of first light beams reflected from the reflective screen 1 300 is refracted in the first facet 505 and travels in the viewing direction of the viewer.

The plurality of second light beams reflected from the reflective screen 2 400 is refracted in the second facet 507 and travels in the viewing direction of the viewer.

However, when a device providing an image is implemented with a display device, not a projector and a reflective screen, an image output by the display device may be directly refracted in the facets 505 and 507 and travel toward the viewing direction of the viewer. That is, the image refracted in the refractive optical screen is not essentially limited to the reflected image, but may be an image output by the display device and an actual object.

Herein, light beams entering a visual field of the viewer among the plurality of first light beams and the plurality of second light beams refracted in the entire prism 500 are limited to light beams between ① and ③.

That is, in the first light beams and the second light beams refracted at an upper side of ①, an angle between each of the facets 505 and 507 and the eye of the viewer is increased to exceed a threshold angle, so that totally reflected light is reflected to a bottom or an upper end, not the front side, and travels. Accordingly, when the viewer views an image at a sufficiently spaced distance, the corresponding light is not incident to the eye. Herein, the critical value refers to an angle at which light is not refracted, but is totally reflected when light travels from a medium having a high refractive index to a medium having a low refractive index.

Accordingly, ① to ③ may be considered as maximum angles at which the light beams reflected from the reflective screens 300 and 400 are incident to the eye. Further, reversely, when the apex angle of the prism 501 is adjusted, a size (or an angle) between ① to ③ may be adjusted.

Accordingly, the plurality of refracted first light beams positioned between ① to ③ is incident to the eye, so that the viewer is capable of viewing the first virtual image. Then, the plurality of refracted second light beams positioned between ① to ③ is incident to the eye, so that the viewer is capable of viewing the second virtual image.

In this case, in order to improve the display of a sense of space in front or/behind the display image 1 and the display image 2 and a visual discrimination between the two images when the two images are viewed at the same time, brightness ratios of the display image 1 and the display image 2 may be differently set. That is, brightness of the front image may be set to be higher than that of a rear image so that the front image is more predominantly viewed than the rear image.

Figure 4:
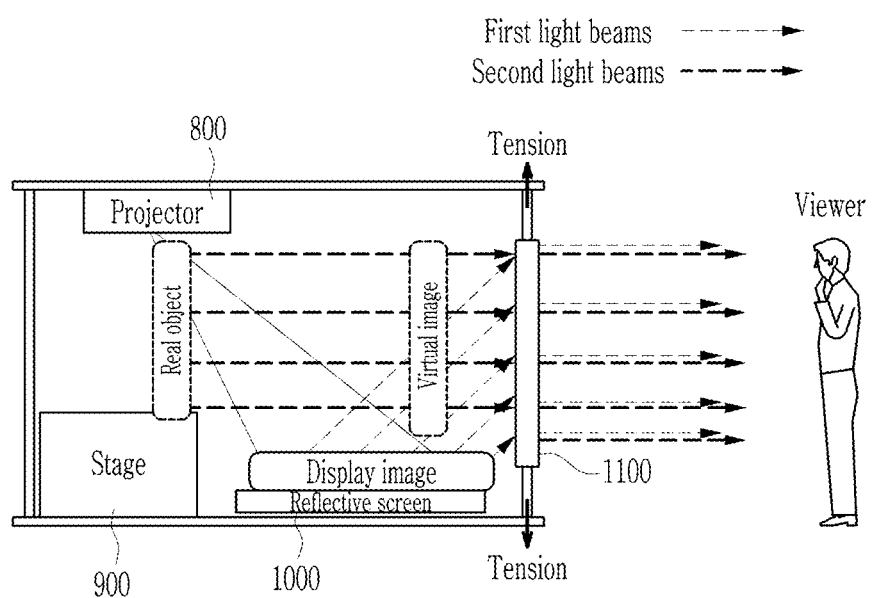
FIG. 4 is a diagram illustrating a configuration of a floating hologram system according to another exemplary embodiment of the present invention.
Figure 5:
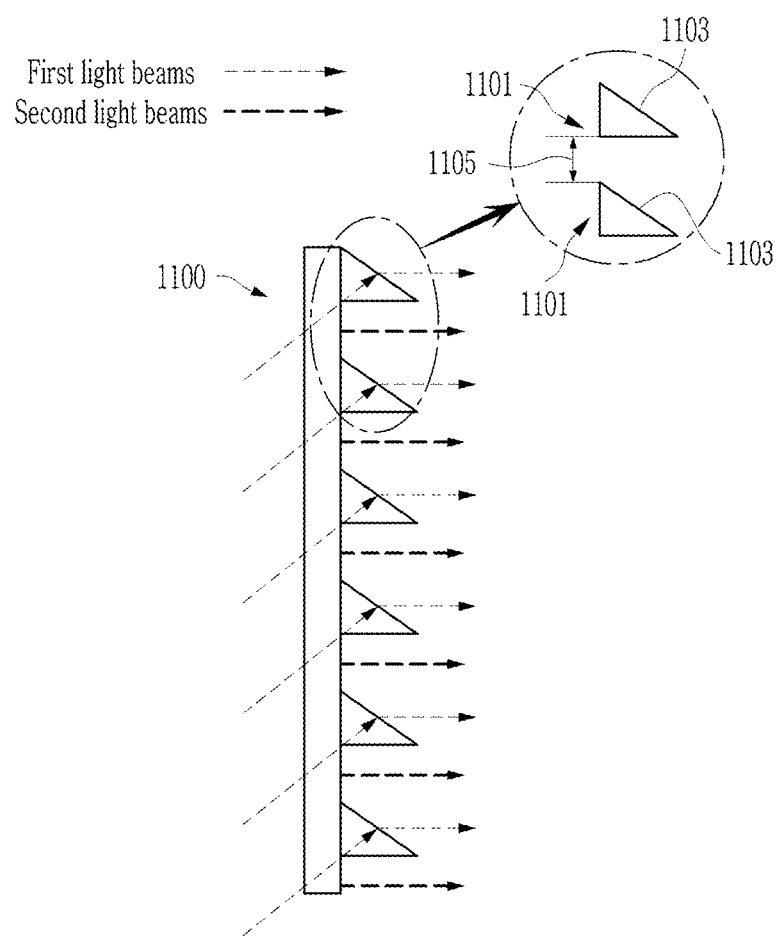
FIG. 5 is a diagram illustrating a detailed configuration of a refractive optical screen of FIG. 4.
Figure 6:
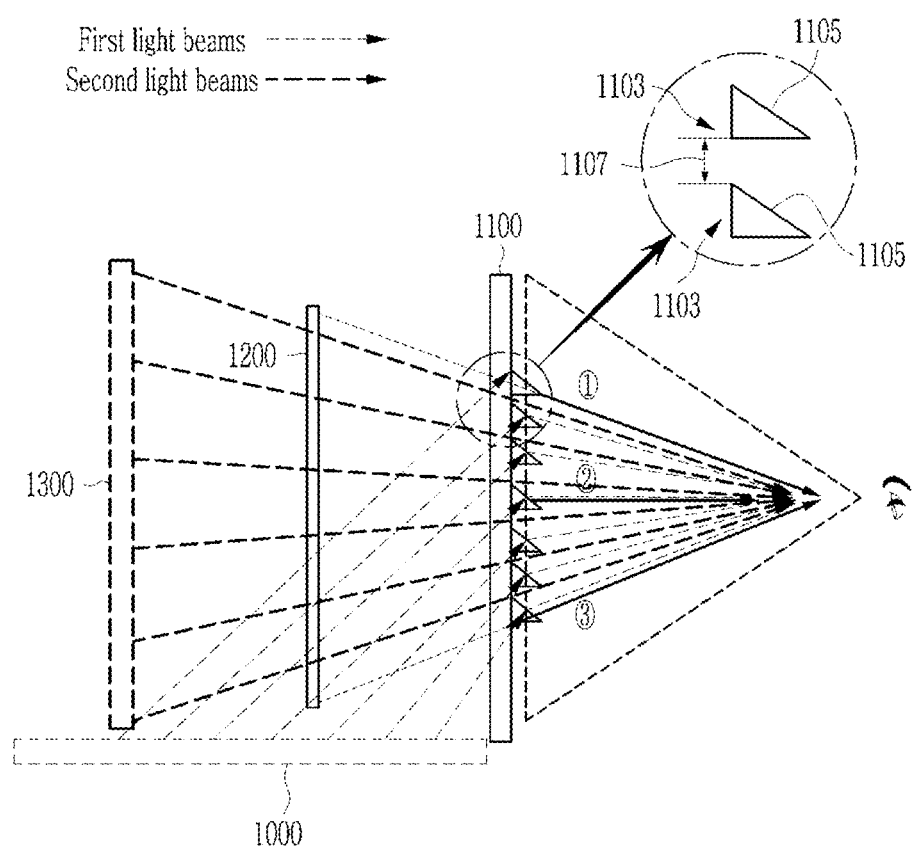
FIG. 6 is a diagram for describing an operation of generating a floating hologram of the refractive optical screen according to another exemplary embodiment of the present invention.

Hereinafter, FIGS. 4 to 6 illustrate another exemplary embodiment of a refractive optical screen and a floating hologram image, which however has the same configuration and principle described with reference to FIGS. 1 to 3, so that the description of the same contents as those described with reference to FIGS. 1 to 3 will be omitted.

FIG. 4 is a diagram illustrating a configuration of a floating hologram system according to another exemplary embodiment of the present invention.

Referring to FIG. 4, the floating hologram system is a system configured so that a transmitted background and one refracted display image are viewed together.

The floating hologram system includes a projector 800, a stage 900, a reflective screen 1000, and a refractive optical screen 1100.

The projector 800 is located in an upper portion of a hologram space and outputs a first image.

The stage 900 is located in a lower portion based on the hologram space, and a real object is disposed on the stage 900.

The reflective screen 1000 is located in a diagonal direction to the projector 800, and reflects the first image.

The refractive optical screen 1100 is arranged at a position facing a viewing direction of a viewer, and when a plurality of first light beams reflected from the reflective screen 1000 is incident, the refractive optical screen 1100 refracts the plurality of first light beams in the viewing direction of the viewer. Then, the refractive optical screen 1100 allows second light beams generated in the real object to straightly pass through in the viewing direction.

Herein, the plurality of refracted first light beams forms a virtual image in the hologram space. Then, the real object image using the second light beams is formed as a background of the virtual image, so that the virtual image and the real object image are implemented together in one space. That is, the viewer views the virtual image and the real object image together.

In this case, in order to provide a floating hologram effect in which the virtual image that is one hologram image and the real object image that is one background image are viewed at the same time, a hologram image may be output on a black background. Then, the background image may be displayed by adjusting brightness, colors, and the like in order to improve a visual effect by improving an expression of a sense of distance from the hologram image or color or brightness contrast. In this case, in order to remove awkwardness of the simultaneously displayed image, the refractive optical screen needs to be configured so that the image is viewed through a very small prism array at a sufficiently far distance. Herein, a size of the prism will be described with reference to FIG. 18.

FIG. 5 is a diagram illustrating a detailed configuration of the refractive optical screen of FIG. 4.

Referring to FIG. 5, compared to the refractive optical screen 500 of FIG. 2, the refractive optical screen 1000 uses a prism having the same property as that of the refractive optical screen 500, but a shape of the prism 1101 and an arrangement structure of the prism 1101 are different from those of the refractive optical screen of FIG. 2.

The refractive optical screen 1100 is formed of a prism array in which the plurality of prisms 1101 is arranged in a line. The prism array may be formed of a micro prism array in which a plurality of trigonal micro prisms, of which at least one apex angle is 90°, is regularly arranged in a direction vertical to a viewing direction of a viewer.

Herein, the plurality of prisms 1101 includes a first facet 1103 which refracts first light beams incident in a first direction, that is, from a lower end, toward the viewing direction of the viewer or a direction of a front side of the refractive optical screen 1100.

In the prism array, the plurality of prisms 1101 is spaced apart from each other by a predetermined gap 1105 and is arranged in a line. In this case, the predetermined gaps 1105 are equally set according to the exemplary embodiment. However, according to another exemplary embodiment, the predetermined gaps 1105 are differently set in consideration of a viewing angle.

In this case, second light beams incident in a different direction from that of the first light beams, that is, from a real object, straightly pass through a gap 1107. That is, the viewer views an image of the real object directly passing through the refractive optical screen 1100.

FIG. 6 is a diagram for describing an operation of generating a floating hologram of the refractive optical screen according to another exemplary embodiment of the present invention.

Referring to FIG. 6, the plurality of first light beams reflected from the reflective screen 1000 is refracted in the first facet 1105 and travels toward the viewing direction of the viewer.

Herein, the light beams entering the visual field of the viewer among the plurality of first light beams refracted in the entire prism 1100 are limited to light beams between ① to ③.

That is, in the first light beams refracted at an upper side of ①, an angle between the facet 1105 and the eye of the viewer is increased and exceeds a critical angle, so that the totally reflected light is reflected to a bottom or an upper end, not the front side, and travels. Accordingly, when the viewer sees an image at a sufficiently spaced distance, the corresponding light is not incident to the eye. Herein, the critical angle refers to an angle at which light is not refracted, but is totally reflected when light travels from a medium having a high refractive index to a medium having a low refractive index.

Accordingly, ① to ③ may be considered as maximum angles at which the light beams reflected from the reflective screens are incident to the eye.

Further, reversely, when the apex angle of the prism 1101 is adjusted, a size (or an angle) between ① to ③ may be adjusted.

In addition, the light beam has a symmetric property in a travelling path. That is, even though light beams reversely travel a path from entry to exit, the light beams identically travel. There is a case where there is innumerably lots of light travelling from a light source to the eye, so that imaging may be simulated with a set of light beams started from the eye and travelling toward the light source as illustrated in the drawing.

References for a size of the prism sheet and a location of a viewer are different according to an application (a mobile device, a TV, a theater, and the like), and an exemplary embodiment to which a display system design reference of a UHDTV based on a Human Visual System (HVS) is applied will be described below with reference to FIG. 18.

As described above, the plurality of refracted first light beams positioned between ① to ③ is incident to the eye, so that the viewer is capable of viewing a virtual image 1200. Regions of 1 and 2 may be formed to have a screen viewing angle so that the facet of the prism located at the lowermost side of the screen is parallel to the visual field of the viewer. Light of regions 2 and 3 is hidden by an adjacent prism array, that is, refracted again, to cause a distortion of an image at a view point of the viewer.

In addition, the second light beams generated in the real object directly pass through the gap 1107 and are incident to the eye of the viewer. Accordingly, the viewer views the transmitted image of the real object.

In this case, a floating hologram image, in which the virtual image is divided into a front image and the real object image is divided into a rear image, is formed.

Figure 7:
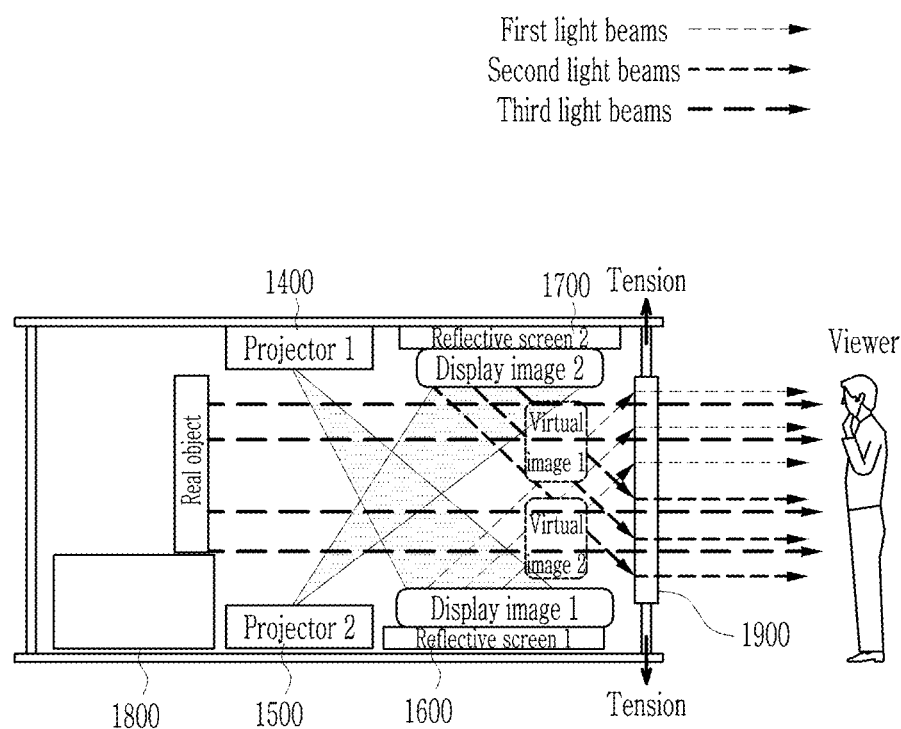
FIG. 7 is a diagram illustrating a configuration of a floating hologram system according to still another exemplary embodiment of the present invention.
Figure 8:
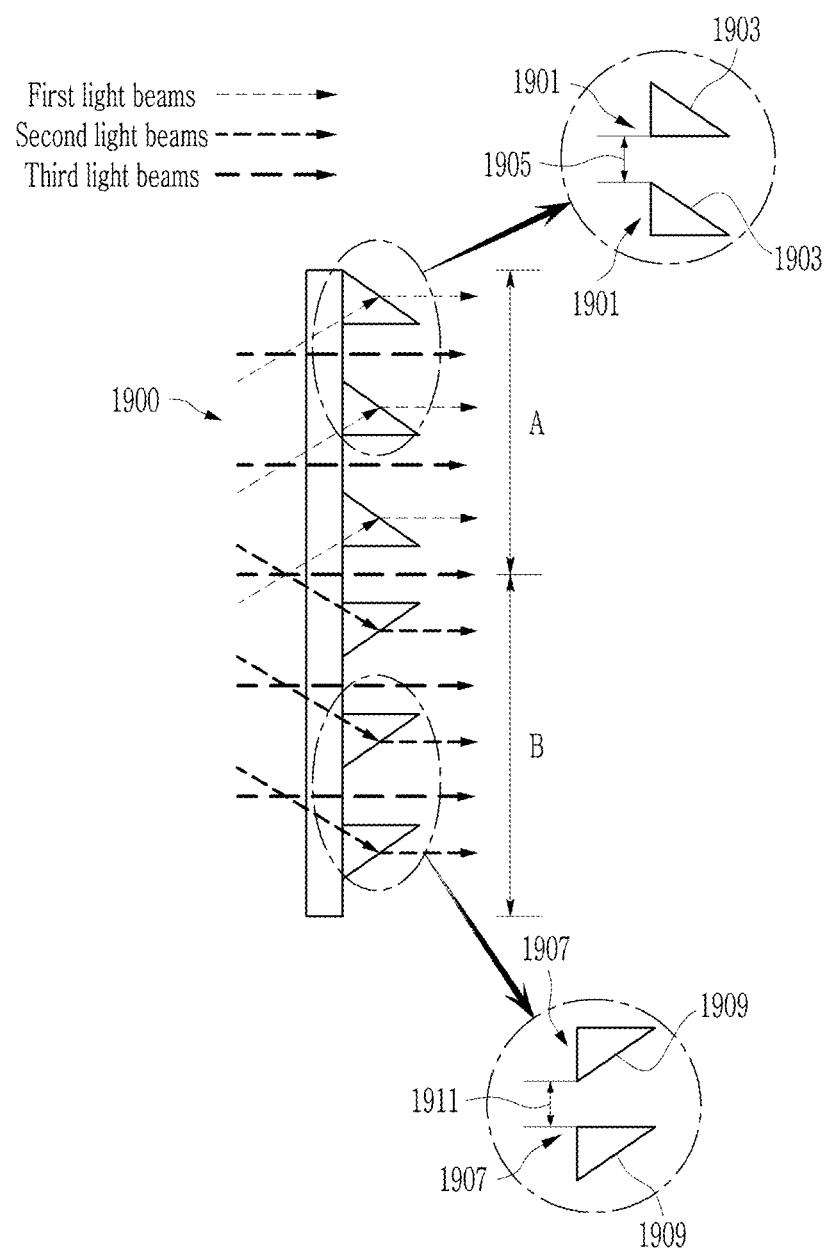
FIG. 8 is a diagram illustrating a detailed configuration of a refractive optical screen of FIG. 7.
Figure 9:
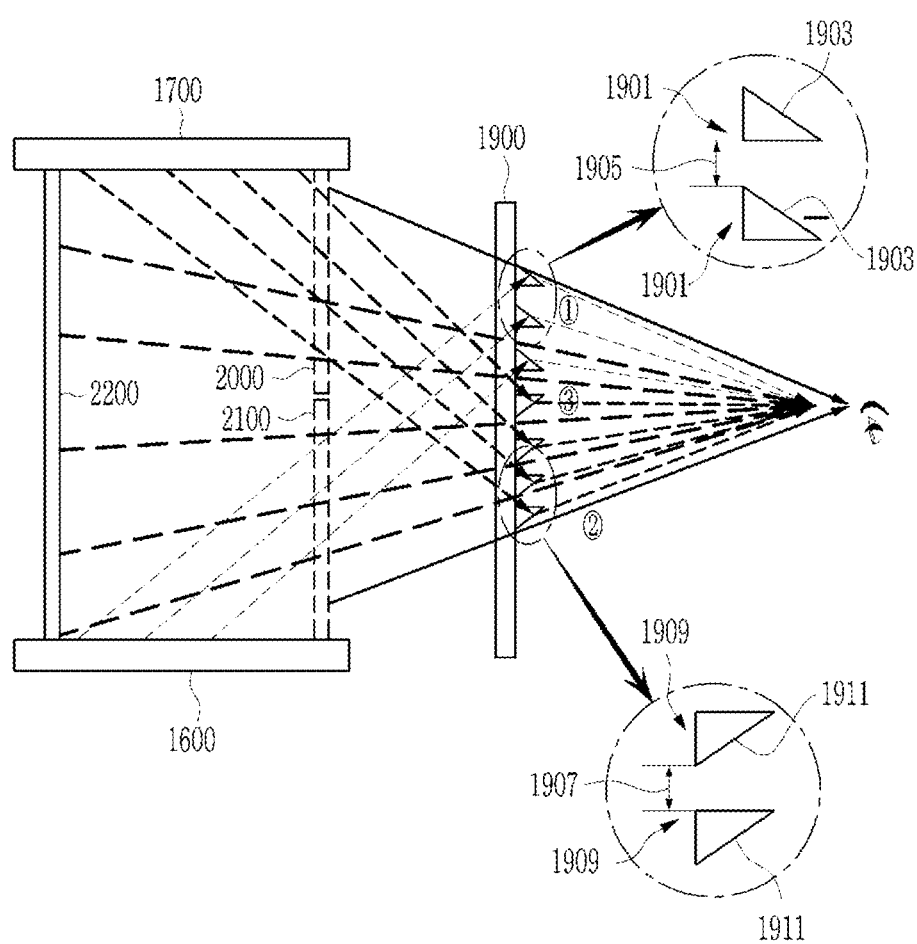
FIG. 9 is a diagram for describing an operation of generating a floating hologram of the refractive optical screen according to still another exemplary embodiment of the present invention.

Hereinafter, FIGS. 7 to 9 illustrate another exemplary embodiment of a refractive optical screen and a floating hologram image, which however has the same principle as that of the configuration described with reference to FIGS. 1 to 6, so that the description of the same contents as the contents described with reference to FIGS. 1 to 6 will be omitted.

FIG. 7 is a diagram illustrating a configuration of a floating hologram system according to still another exemplary embodiment of the present invention.

Referring to FIG. 7, a floating hologram system is implemented so that a viewer views a virtual image 1 located at an upper end of a hologram space, a virtual image 2 located at a lower end, and a background real object image together.

The floating hologram system includes a projector 1 1400, a projector 2 1500, a reflective screen 1 1600, a reflective screen 2 1700, a stage 1800, and a refractive optical screen 1900.

The projector 1 1400 is located in an upper portion based on the hologram space and outputs a first image. The projector 2 1500 is located in a lower portion based on the hologram space and outputs a second image. The reflective screen 1 1600 is located in a direction diagonal to the projector 1 1400 and in a lower portion based on the hologram space and reflects the first image. The reflective screen 2 1700 is located in a direction diagonal to the projector 2 1500 and in an upper portion based on the hologram space and reflects the second image.

A real object is located on the stage 1800. The stage 1800 is located behind the projector 1 1400 and the projector 2 1500.

The refractive optical screen 1900 is disposed at a position facing a viewing direction of the viewer.

When a plurality of first beams reflected from the reflective screen 1 1600 is incident, the refractive optical screen 1900 refracts the first light beams toward a viewing direction of the viewer. Then, when a plurality of second beams reflected from the reflective screen 2 is incident, the refractive optical screen 1900 refracts the second light beams toward the viewing direction. Then, the refractive optical screen 1900 allows third light beams generated in the real object to straightly pass through in the viewing direction.

Herein, the plurality of refracted first light beams forms a first virtual image in the hologram space and the plurality of refracted second light beams forms a second virtual image in the hologram space, and the first virtual image, the second virtual image, and the real object image using the third light beams are formed together in the hologram space.

In this case, the first virtual image is output at the upper end of the hologram space and the second virtual image is output at the lower end of the hologram space. Then, the first virtual image and the second virtual image may be divided as front images, and the real object image may be divided as a rear image. Accordingly, the real object image is output as a background image of the first virtual image and the second virtual image that are the front images. That is, in the hologram space, a floating hologram image, in which the first virtual image is an upper front image, the second virtual image is a lower front image, and the real object image is a rear image, is formed. In this case, in order to remove awkwardness of the simultaneously displayed image, the refractive optical screen needs to be configured so that the image is viewed through a very small prism array at a sufficiently far distance.

However, the first virtual image and the second virtual image are not necessarily the front images, and the real object image is not necessarily the rear image. The front image and the rear image may be different depending on how the scene is directed. In the case where it is assumed that the reflective screen is an LCD display, when a system is configured so as to move (in accordance with a refraction angle) in accordance with a direction scenario by connecting a rail and a motor, a physical forming location of a virtual image is changed according to time, so that a feeling of actually moving may be provided. That is, in this case, the discrimination of the front side and the rear side is not important.

FIG. 8 is a diagram illustrating a detailed configuration of the refractive optical screen of FIG. 7.

Referring to FIG. 8, compared to the refractive optical screen 1100 of FIG. 5, the refractive optical screen 1900 uses a prism having the same property as that of the refractive optical screen 1100, but a shape of the prism 1901 and an arrangement structure of the prism 1901 are different from those of the refractive optical screen of FIG. 5.

The refractive optical screen 1900 is formed of a prism array in which the plurality of prisms 1901 is arranged in a line. The prism array may be formed of a micro prism array in which a plurality of trigonal micro prisms, of which at least one apex angle is 90° is regularly arranged in a direction vertical to a viewing direction of a viewer.

Herein, the refractive optical screen 1900 is formed of the prism array, in which the plurality of first prisms 1901 and the plurality of second prisms 1907 have a symmetric structure.

The plurality of first prisms 1901 includes a first facet 1903 which refracts the first light beams incident in the first direction toward the viewing direction of the viewer. Then, the plurality of first prisms 1901 is spaced apart from each other while forming a predetermined gap 1905 and is arranged in a line in a direction vertical to the viewing direction of the viewer.

The plurality of second prisms 1907 includes a second facet 1909 which refracts the second light beams incident in the second first direction that is different from the first direction toward the viewing direction of the viewer. Then, the plurality of second prisms 1907 is spaced apart from each other while forming a predetermined gap 1911 and is arranged in a line in a direction vertical to the viewing direction of the viewer.

The plurality of first prisms 1901 and the plurality of second prisms 1907 have a symmetric shape.

The plurality of first prisms 1901 is the micro trigonal prism having the same angle and size, and the plurality of second prisms 1907 is the micro trigonal prism having the shape symmetric to the plurality of first prisms 1901 and having the same angle and size.

Herein, when the first prism 1901 and the second prism 1907 are symmetric to each other, it is possible to symmetrically configure the positions of imaging, which is easy for the configuration or the simulation of the system, but the first prism 1901 and the second prism 1907 are not necessarily symmetric to each other. A refraction angle depends on a size of the apex angle.

In the prism array, the plurality of first prisms 1901 and the plurality of second prisms 1907 are formed at the same gap in the vertical direction to the viewing direction and are regularly arranged in a structure symmetric based on a center of the viewing direction.

Herein the predetermined gaps 1905 and 1911 may be the same. When the predetermined gaps 1905 and 1911 are the same, light of the transmitted background image is uniform, so that the image is little distorted at the view point of the viewer. Then, the third light beams incident in a different direction from that of each of the first light beam and the second light beam straightly pass through the gaps 1905 and 1911.

FIG. 9 is a diagram for describing an operation of generating a floating hologram of the refractive optical screen according to still another exemplary embodiment of the present invention.

Referring to FIG. 9, the refractive optical screen is operated in the same principle as that described with reference to FIGS. 1 to 7.

The plurality of first light beams reflected from the reflective screen 1 1600 is refracted toward the viewing direction through the first facets 1903 of the plurality of first prisms 1901 and is incident to the eye of the viewer. Then, the plurality of refracted first light beams forms a first virtual image 2000, so that the viewer views a hologram image, in which the first virtual image 2000 is output, at the upper end of the hologram space. In this case, only the plurality of first light beams located within the critical angle (the angle between ① and ③) among the plurality of refracted first light beams is incident to the eye of the viewer, so that the viewer is capable of viewing the first virtual image 200 with the eye by the plurality of first light beams.

Further, the plurality of second light beams reflected from the reflective screen 2 1700 is refracted toward the viewing direction through the second facets 1911 of the plurality of second prisms 1907 and is incident to the eye of the viewer. Then, the plurality of refracted second light beams forms a second virtual image 2100, so that the viewer views a hologram image, in which the second virtual image 2100 is output, at the upper end of the hologram space. In this case, only the plurality of second light beams located within the critical angle (the angle between ① and ③) among the plurality of refracted second light beams is incident to the eye of the viewer, so that the viewer is capable of viewing the second virtual image 2100 with the eye by the plurality of second light beams.

Further, the third light beams generated by the real object straightly pass through the gaps 1905 and 1907 and are incident to the eye of the viewer. Accordingly, the viewer views the real object image passing through the refractive optical screen 1900.

Herein, in the case where the viewer views the image with the eye at a sufficiently spaced distance, light that is not refracted and directly passes through or totally reflected light travels toward the upper end or the lower end, so that the viewer cannot see the light with the eye.

The plurality of prisms 1901 and 1909 are symmetrically configured based on a center (the front side of the eye) of a film to enable the viewer to view an upper end image 2000, a lower end image 2100, and a background image 2200 together. The background image 2200 is located at an outer side of the light beams of the critical angle (the angle between ① to ③) of the refractive optical screen 1900, so that the refracted light is not incident to the eye.

The light directly passes through transparent portions 1905 and 1907, in which the real object prism does not exist, located behind the prism and is incident to the eye, so that the refractive optical screen may be configured so that a region, in which the first virtual image 2000 is viewed, and a region, in which the second virtual image 2100 is viewed, are divided and are incident to the eye. In this case, the refractive optical screen may increase resolution so that it is difficult for the viewer to visually discriminate the image and may express the image so that the viewer cannot feel awkward by configuring the sufficiently small micro prism array at a sufficiently spaced distance.

In this case, in order to remove awkwardness of the simultaneously displayed image, the refractive optical screen needs to be configured so that the image is viewed through a very small prism array at a sufficiently far distance. That is, in order to express a sense of distance, it is possible to adjust color/brightness/contrast by defocusing an image object or geometrically transform a position/size/perspective and the like of an object and output the transformed object by applying a human visual system method through a hologram image processing software (S/W) module.

Otherwise, a method of physically moving a focusing position of a virtual image by adjusting a position of a displayed image may also be applied.

In general, the two methods (the method of physically moving a virtual image and the method of providing a sense of space by applying an image processing method, such as virtual reality) may be applied together.

Figure 10:
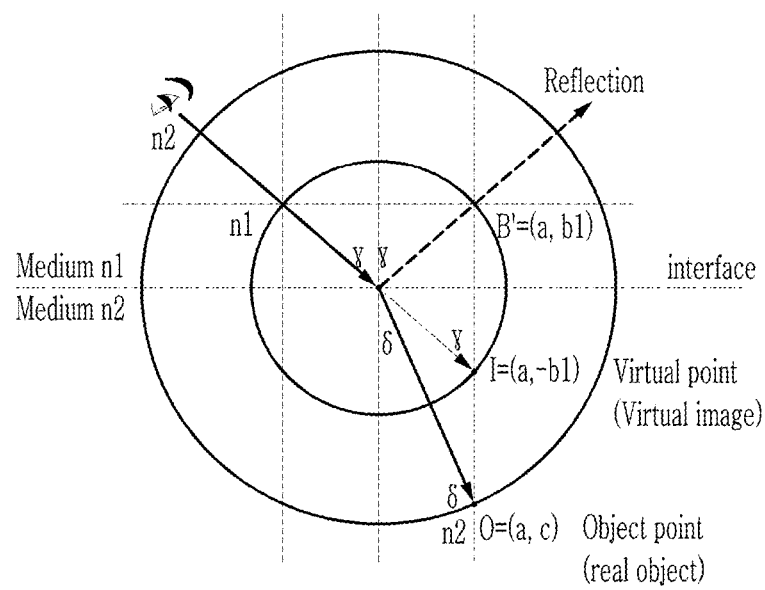
FIGS. 10 and 11 are diagrams illustrating a path of travelling light according to an incident angle of light according to an exemplary embodiment of the present invention.
Figure 11:
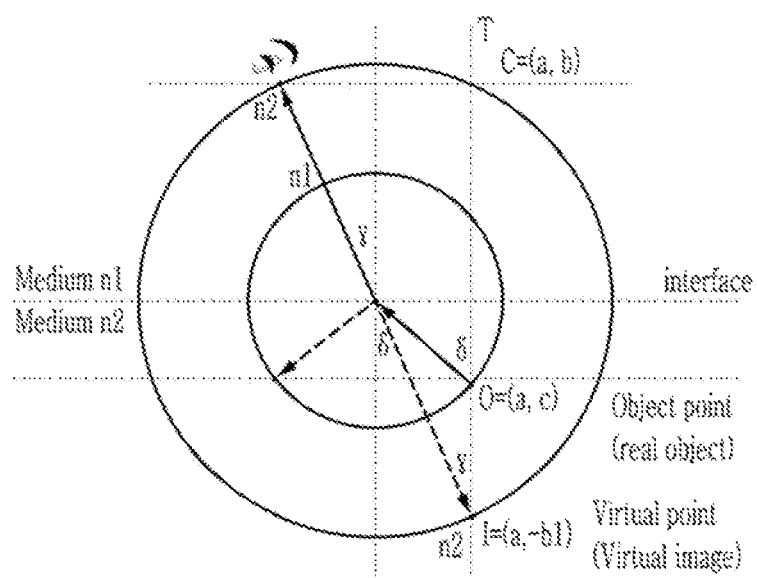

FIGS. 10 and 11 are diagrams illustrating a path of travelling light according to an incident angle of light according to an exemplary embodiment of the present invention, and illustrate geometrical construction by using Snell's law.

Here, FIGS. 10 and 11 are diagrams for formulating and explaining the relation between an incident angle and a refraction angle, and distance ratios of an object point and a virtual point when light is refracted at an interface between media n1 and n2 according to Snell's law.

Referring to FIG. 10, when the eye of a person is located at a medium n1 and an object point (actual object) exists at O (=a, c) of a medium n2, the person recognizes that a virtual point (virtual image) exists at I (=(a, −b1)). In this case, b1/c that is a ratio of distances based on an interface of the medium n1 and the medium n2 may be organized as Equation 1 below.

$$\frac{b1}{c} = \frac{n1}{n2} * \frac{\cos(\gamma)}{\cos(\delta)} = \sqrt{1 + \frac{\left(\frac{n1}{n2}\right)^2 - 1}{1 - \sin^2(\delta)}} = \sqrt{1 + \frac{\left(\frac{n1}{n2}\right)^2 - 1}{1 - \left(\frac{n1}{n2}\right)^2 * \sin^2(\gamma)}}$$ 
[Equation 1]

Herein, a refractive index of medium 1 is n1, a refractive index of medium 2 is n2, 0 is an object point, I is a virtual point, $\gamma$ is a light beam angle at the eye side, and $\delta$ is a light beam angle of the object side.

When it is assumed that n1 is air and n2 is water, and when an object point O existing in water is viewed at an angle of $\gamma$ in the air, the object point O is viewed as if the object point O exists at the virtual point I.

Referring to FIG. 11, b1/c is derived by Equation 2 below.

$$\frac{b1}{c} = \frac{n1}{n2} * \frac{\cos(\gamma)}{\cos(\delta)} = \sqrt{1 + \frac{1 - \left(\frac{n1}{n2}\right)^2}{\left(\frac{n1}{n2}\right)^2 - \sin^2(\gamma)}} = \sqrt{1 + \frac{\left(\frac{n2}{n1}\right)^2 - 1}{1 - \sin^2(\delta)}}$$
[Equation 2]

Herein, a refractive index of medium 1 is n1, a refractive index of medium 2 is n2, 0 is an object point, I is a virtual point, $\gamma$ is a light beam angle at the eye side, and $\delta$ is a light beam angle of the object side.

When it is assumed that n1 is air and n2 is water, and when an object point O existing in the air is viewed at an angle of $\gamma$ in water, the object point O is viewed as if the object point O exists at the virtual point I.

Figure 12:
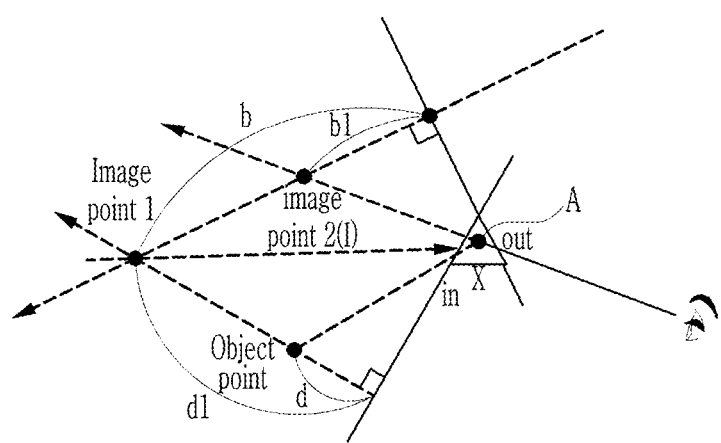
FIG. 12 is a diagram illustrating a case of simulating a path of travelling light according to an incident angle of light passing through a prism according to an exemplary embodiment of the present invention.

FIG. 12 is a diagram illustrating a case of simulating a path of travelling light according to an incident angle of light passing through a prism according to an exemplary embodiment of the present invention.

Referring to FIG. 12, light incident from the object point O in the air to the prism travels into the prism and then is emitted to the air from the prism again, which is the same principle as the continuous application of FIGS. 10 and 11. Accordingly, this case is determined to be the same as the case where the object point O is shifted to an image point I by first refraction and the image point 1 is shifted to an image point 2(I) by second refraction. In this case, a ratio of a distance Oin between the object point O and an incident surface of the prism and a distance Iout between the image point 2(I) and an exit surface of the prism may be organized as described below with reference to FIGS. 10 and 11.

$$b = (c + X) * \cos(\theta_2') = \left\{ \left[ d * \sqrt{1 + \frac{\left(\frac{n2}{1}\right)^2 - 1}{1 - \sin^2(\theta_1)}} \right] / \cos(\theta_1') + x \right\} * \cos(\theta_2')$$
[Equation 3]

x=Travelling distance of light inside the prism

Herein, a black color triangle "A" represents one prism at a specific location in the prism array. "b" represents a distance between the image point 1 and a point at which the image point 1 vertically meets an extension line of the facet in which the exit surface of the prism exists, and b1 represents a distance between the image point 2 formed from the image point 1 by the second refraction and a point at which the image point 2 vertically meets the extension line of the facet in which the exit surface of the prism exists. "x" represents a travelling distance of light inside the prism from the entry to the prism to the exit from the prism, and the remaining notations follow the relation between an incident angle and an exit angle of light according to the prism expressed by enlarging the prism and Snell's law.

$$d1 = d * \sqrt{1 + \frac{\left(\frac{n2}{1}\right)^2 - 1}{1 - \sin^2(\theta_1)}}$$
[Equation 4]

Herein, Equation 4 represents a distance ratio of the object (d) and the image point 1 (d1) which vertically meet an extension line of the facet in which the incident surface of the prism exists when the object point O forms a virtual image at the image point 1 by the first refraction of the prism as illustrated in FIG. 11.

$$b1 = b * \sqrt{1 + \frac{\left(\frac{1}{n2}\right)^2 - 1}{1 - \left(\frac{1}{n2}\right)^2 * \sin^2(\theta_2)}}$$
[Equation 5]

$$= b * \frac{\cos(\theta_2)}{n * \cos(\theta_2')} = \left\{ \frac{n * d}{\cos(\theta_1)} + x \right\} *$$

$$\cos(\theta_2') * \frac{\cos(\theta_2)}{n * \cos(\theta_2')}$$

$$= \left\{ \frac{n * d}{\cos(\theta_1)} + x \right\} * \frac{\cos(\theta_2)}{n}$$

Herein, Equation 5 represents a distance ratio of the image point 1 (b) and the image point 2 (b1) which vertically meet the extension line of the facet in which the exit surface of the prism exists when the image point 1 forms the virtual image at the image point 2 by the second refraction of the prism as illustrated in FIG. 10.

$$\frac{Iout}{Oin} = \frac{\left\{\frac{b1}{\cos(\theta_2)}\right\}}{\left\{\frac{d}{\cos(\theta_1)}\right\}} = \frac{b1*\cos(\theta_1)}{d*\cos(\theta_2)}$$
$$= \left\{\frac{n*d}{\cos(\theta_1)} + x\right\} * \frac{\cos(\theta_2)}{n} * \frac{1}{d} * \frac{\cos(\theta_1)}{\cos(\theta_2)}$$
$$= \left\{\frac{n*d}{\cos(\theta_1)} + x\right\} * \frac{\cos(\theta_1)}{n} = 1 + \frac{x*\cos(\theta_1)}{n*d}$$

[Equation 6]

A ratio of the distance Oin from the object point O to the incident surface of the prism to the distance Iout from the virtual point I to the exit surface in FIG. 12 is organized as Equation 6. "x" means a distance of light travelling inside the prism, and when a size of the prism is sufficiently small like the micro-prism array, it can be confirmed that Iout/Oin has a value approximately close to 1.

Figure 13:
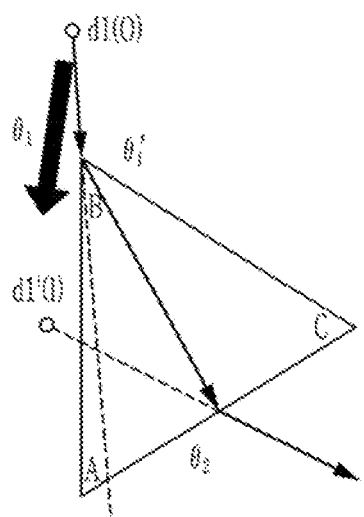
FIG. 13 is a diagram illustrating a path of light beams of the uppermost prism in a prism array according to the exemplary embodiment of the present invention.
Figure 14:
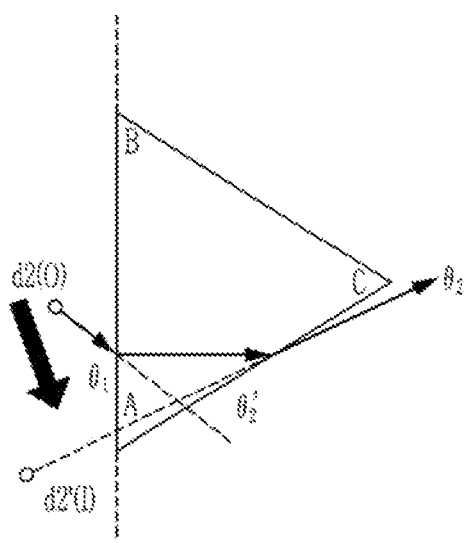
FIG. 14 is a diagram illustrating a path of light beams of the lowermost prism in the prism array according to the exemplary embodiment of the present invention.
Figure 15:
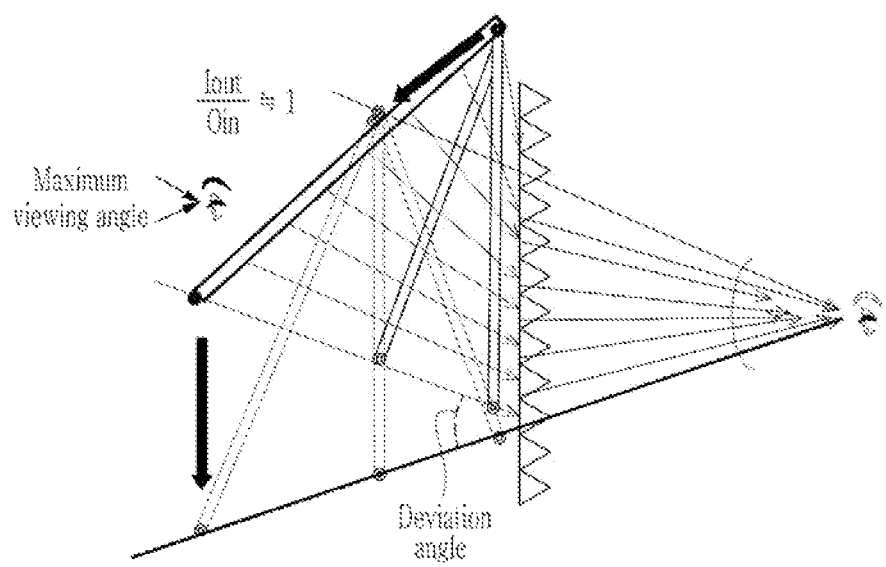
FIG. 15 is a diagram illustrating a path of light beams in the prism array according to the exemplary embodiment of the present invention.

FIG. 13 is a diagram illustrating a path of light beams of the uppermost prism in the prism array according to the exemplary embodiment of the present invention, FIG. 14 is a diagram illustrating a path of light beam of the lowermost prism in the prism array according to the exemplary embodiment of the present invention, and FIG. 15 is a diagram illustrating a path of light beams in the prism array according to the exemplary embodiment of the present invention.

First, FIG. 13 represents a maximum angle at which light incident at an angle close to a critical angle, that is, incident approximately horizontally to surface is refracted and travels. For example, a maximum angle at which light of the rightmost (the side closest to the sheet) pixel of the second display at the upper end may reach, and the viewer is capable of viewing the second display behind a reach area of the corresponding light beams. Accordingly, d1 may be determined according to a visible area of the viewer, and thus a location condition of the upper display may be determined. $\theta_1'$ is a first critical angel or A.

By the similar manner, FIG. 14 represents a maximum angle at which light of the leftmost (the side farthest from the sheet) pixel of the first reflective screen may reach, and the viewer is capable of viewing the second display behind a reach area of the corresponding light beams. Accordingly, d2 may be determined according to a visible area of the viewer, and thus a location condition of the second display may be determined. The location condition of the second reflective screen may be applicable to the upper facet by the similar manner. The light emit approximately horizontally to surface. $\theta_2'$ is a second critical angel or A.

FIG. 15 illustrates the content of the simulation of a location and an angle of a virtual image formed according to an installation angle of the reflective screen on an assumption that the distance ratio of the object point O and the image point I is 1.

Referring to FIG. 15, each of the image points on the reflective screen forms a virtual image point on the extension line having the same length with respect to the refractive surface of the prism. That is, an angle at which the virtual image is formed is changed according to the installation angle of the screen, and a length of the screen required for forming the virtual image having the same size is changed.

Figure 16:
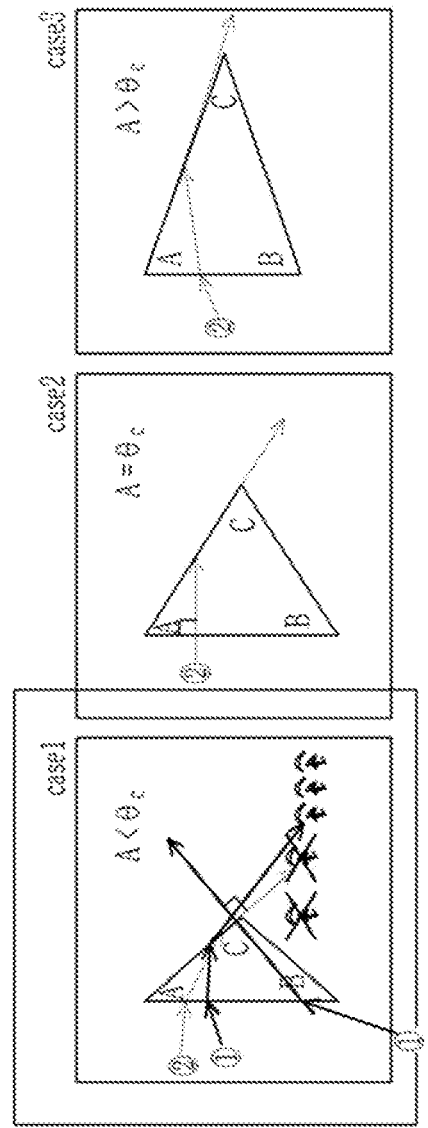
FIG. 16 is a diagram for describing a condition of a preferable prism apex angle C in consideration of positions of a viewer and a display according to the exemplary embodiment of the present invention.

FIG. 16 is a diagram for describing a condition of a prism apex angle C in consideration of positions of a viewer and a display according to the exemplary embodiment of the present invention.

Herein, case 1 corresponds to the case where $A<\theta_c$, case 2 corresponds to the case where $A=\theta_c$, and case 3 corresponds to the case where $A>\theta_c$.

Referring to FIG. 16, in the case of the lower first display, the light incident at the critical angle may travel to be horizontal to the upper facet, so that an audience is capable of viewing the lower display at the rear side of the extension line of the upper facet, and a condition of an installation position/angle of the display may be set based on the light beams ①, ①, ② of case 1 depending on a definition of an effective viewing distance of the audience. ① is the light beam of uppermost pixel of first display for uppermost prism. ① is the light beam of lowermost pixel of first display for lowermost prism. As the apex angle C is small like case 2 and case 3, the effective viewing distance is increased.

Accordingly, it is preferable to set the apex angle C as large as possible, but when "A" is decreased, a refractive angle is also decreased, so that "A" needs to be set to be sufficiently large in consideration of a physical installation condition of the displays, that is, in a manner so that the upper second display does not overlap the lower first display.

Figure 17:
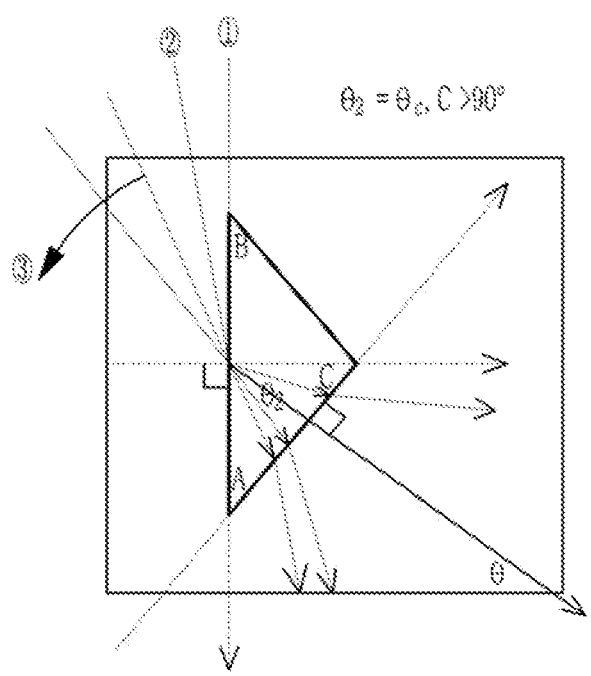
FIG. 17 is a diagram illustrating the case where light is refracted and travels when an apex angle C is larger than 90° like case 1 of FIG. 16.

FIG. 17 is a diagram illustrating the case where light is refracted and travels when an apex angle C is larger than 90° like case 1 of FIG. 16. That is, FIG. 17 corresponds to the case where $\theta_2=\theta_c$, C>90°.

Referring to FIG. 17, in the case where the exit angle with respect to the lower facet is larger than 90° (light beams ①, light beams ②), a deviation angle in the second refraction is negative (−), so that an image distortion is large in this section. Accordingly, when FIG. 17 is applied to the uppermost prism, the position of the display may be set so that the rightmost pixel (the side closest to the sheet) of the upper second display is located at the left side of light beams ③ of which the exit angle is smaller than 90°. When the exit angle is vertical to a surface (③), θ=A. Herein, θ is an angle between light and a floor surface.

Figure 18:
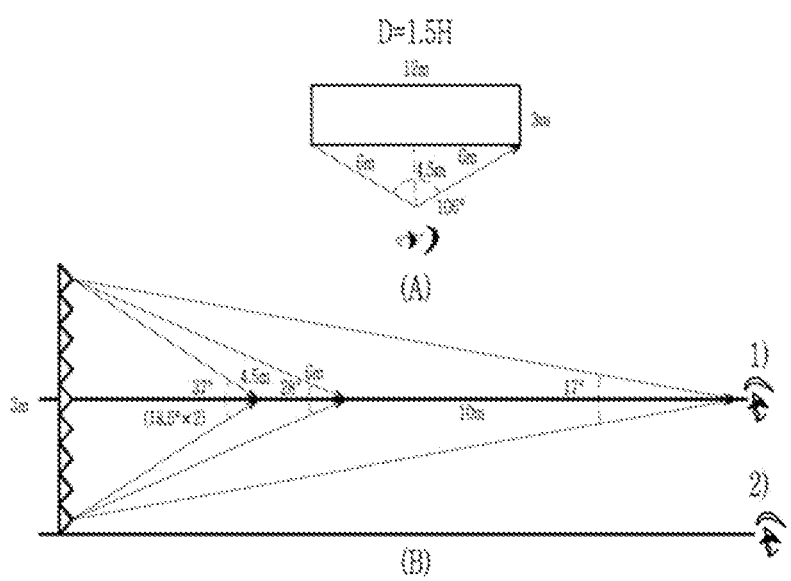
FIG. 18 is a diagram for describing a pitch size condition of a prism array for obtaining a high-quality virtual image at a reference viewing distance of an audience according to the exemplary embodiment of the present invention.

FIG. 18 is a diagram for describing a pitch size condition of the prism array for obtaining a high-quality virtual image in a reference viewing distance of an audience.

FIG. 18(A) represents the case where D=1.5H, a viewer views the optical screen at a viewing angle of 8K based on 4K, and the optical screen is 12 m wide and 3 m long, and a viewing angle of the viewer is 106°. In this case, a distance between the optical screen and the visual field of the viewer is 4.5 m. In FIG. 18(B), a total distance between the optical screen (prism array) of 3 m long and the visual field of the viewer is 10 m. A distance between the viewer with respect to the optical screen at a viewing distance of 10 m is 17°, a viewing angle of the viewer with respect to the optical screen at a viewing distance of 6 m is 28°, and a viewing angle of the viewer with respect to the optical screen at a viewing distance of 4.5 m is 37° (18.5°×2).

In this case, in FIG. 18, a prism pitch in the level of 100 microns is derived based on per degree in order to display a virtual image at the reference viewing distance without awkwardness. The pitch size is one of the important parameters determining a characteristic of the prism, so that the pitch size is the condition of the parameter limited for implementing the hologram system (refractive optical screen).

For example, in the case of the UHDTV, a reference of a system design in consideration of the human visual system (HVS) is that a viewer views the screen at a distance away from the screen by 1.5 times of a height of the screen in the case of resolution 4K, and a viewer views the screen at a distance away from the screen by 0.75 time of a height of the screen in the case of resolution 8K, and when the reference is applied to the pseudo hologram system according to the exemplary embodiment of the present invention, a change in an angle according to a distance from the prism array is described. When this is applied to a Cycles Per Degree (CPD), the following is given. The CPD represents the number of stripe pairs for a viewing angle of 1°.

In general, a CPD based on eyesight 1.0 is 30 (30×2 pixels per degree, 30 line pairs), a human retina limit CPD is 60 (which is maximum, and is commonly in the level of 40 to 50), when a viewing angle is 37°, 60×2×37 lines=4440 prisms, and 100 μm prisms×4440=444 mm=44.4 cm.

That is, when the pitch size is 100 μm, a prism sheet having a size of about 40 cm may be used in the viewing environment of FIG. 18.

When the same prisms are repeatedly arranged in the prism array, an angle (an angle of light exit from the prism enters the eye) between the eye and the prism surface according to a location of the prism is continuously increased in the form of $\gamma i + ai$, so that a deviation angle is nonlinearly increased, thereby generating a distortion of a virtual image. Accordingly, in order to minimize an image distortion, the incident angles may be set to be the same in all of the prisms by equally setting the incident angles based on the relation of c (constant)= $\gamma i + ai + a$.

Figure 19:
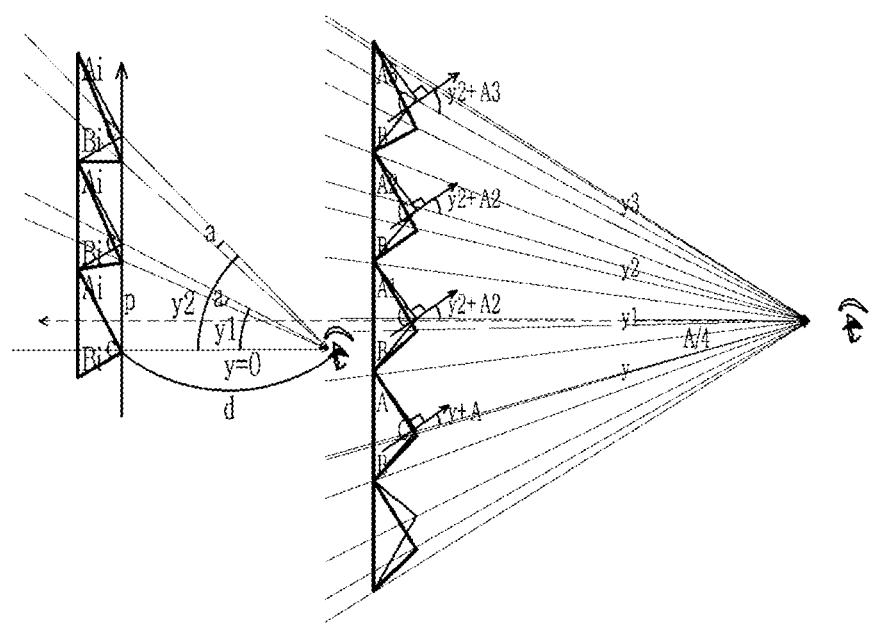
FIG. 19 is a diagram illustrating an apex angle condition of the $i^{th}$ prism so as to have the same incident angle for respective prism arrays according to the exemplary embodiment of the present invention.

FIG. 19 is a diagram illustrating an apex angle condition of the $i^{th}$ prism so as to have the same incident angle for the respective prism arrays according to the exemplary embodiment of the present invention.

Referring to FIG. 19, $\gamma i$ represents an angle between a segment of a line connecting the eye of the viewer and an apex C of the $i^{th}$ prism and a reference horizontal surface (the front side of the eye), and ai represents an apex angle of an upper end of the prism. Then, "a" is a predetermined constant, and a ratio of upper facet light and lower facet light incident to the eye may be adjusted by using the constant. "A" ratio of brightness when the viewer views the images of the display 1 and the display 2 at the same time may be determined by using the ratio of the light. In this case, $\gamma i$ may be expressed as Equation 7.

$$\gamma i = \tan\left(\frac{i * p}{d}\right) \quad \text{[Equation 7]}$$

Herein, d represents a distance between the eye and the prism at a reference viewing distance, and p represents a distance (pitch) between the prisms. Further, i represents an order (index) of the corresponding prism (an index of the prism in front of the eye is 0).

Herein, in the case of $\gamma 3$, an angle from an angle point C of 90° of the first prism having apex angles A3 and "B" is $\gamma 3 + A3$, in the case of $\gamma 2$, an angle from an angle point C of 90° of the prism having apex angles A2 and "B" is $\gamma 3 + A2$, in the case of $\gamma 1$, an angle from an angle point C of 90° of the prism having apex angles A1 and "B" is $\gamma 3 + A2$, and in the case of $\gamma$, an angle from an angle point C of 90° of the prism having apex angles A and "B" is $\gamma 3 + A$.

Figure 20:
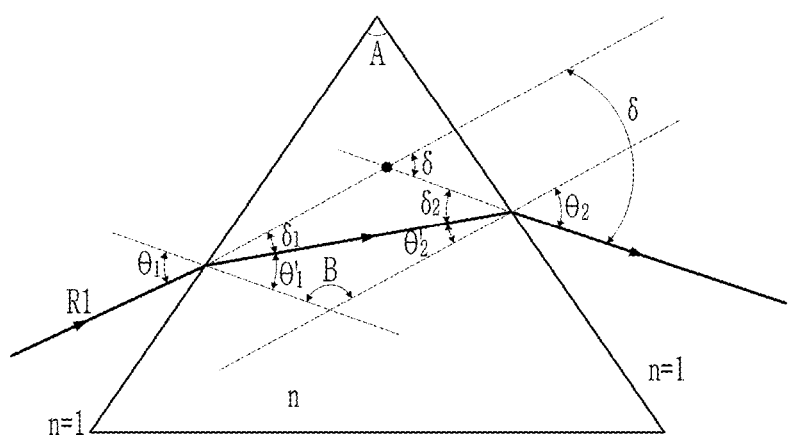
FIG. 20 is a diagram illustrating a travelling path of light that passes through a prism according to the exemplary embodiment of the present invention.

FIG. 20 is a diagram illustrating a travelling path of light that passes through a prism according to the exemplary embodiment of the present invention.

Referring to FIG. 20, light incident at an angle $\theta_1$ like black light beams R1 at a lower end is primarily refracted on a surface of a medium having a refractive index of n, and is secondarily refracted on the surface while existing from the medium to the air again.

In this case, in general, when the Snell's law is applied, a refraction angle δ between the incident light and the exit light is expressed by Equation 8 below.

$$\delta = \theta_1 + \sin^{-1}[(\sin A)\sqrt{(n^2 - \sin^2(\theta_1))} - \cos A \sin \theta_1] - A \quad \text{[Equation 8]}$$

That is, a refraction angle δ is defined based on the relation between a refraction angle δ, an incident angle $\theta_1$, a refractive index n, and an apex angle A.

When it is assumed that the viewer views light exiting at $\theta_2$, a condition under which light exited from an upper image and light exited from a lower image are emitted toward the upper facet together may be considered. This may be equally applied to the case where the light is symmetrically exited to the lower facet.

In this case, a value of $\theta_2$ is increased from a center prism to an edge. Accordingly, that is, light up to the prism in which $\theta_2$ is $\theta_c$ is totally reflected, and light at the upper side or the lower side of the prism is refracted and is incident to the eye.

The aforementioned exemplary embodiment of the present invention is not implemented only by the apparatus and the method, and may be implemented by a program executing a function corresponding to the configuration of the exemplary embodiment of the present invention or a recording medium, in which the program is recorded.

The invention claimed is:

1. A refractive optical screen which refracts incident light beams and adjusts a travelling direction of the light beams, the refractive optical screen comprising:
   a prism array in which a plurality of prisms for refracting one or more light beams toward a viewing direction of a viewer located at a front side of the refractive optical screen is arranged in a line,
   wherein one or more virtual images formed by the one or more refracted light beams exist in one space to form a floating hologram,
   wherein the prism array includes a plurality of trigonal prisms each having a predetermined apex angle different from the other, and the predetermined apex angle of each trigonal prisms is determined based on an angle between a segment of a line connecting a visual field of the viewer and an apex of each prism and a reference horizontal surface, an upper apex angle of each prism, and a light beam passing ratio between a first facet disposed at an upper portion of each prism and a second facet disposed in a lower end of the prism in order to control all the trigonal prisms to have the same incident angle.

2. The refractive optical screen of claim 1, wherein:
   in the prism array,
   the plurality of prisms, which refracts first light beams incident in a first direction toward the viewing direction and refracts second light beams incident in a second direction different from the first direction toward the viewing direction, is continuously arranged in a line.

3. The refractive optical screen of claim 2, wherein:
   in the prism array,
   a plurality of micro trigonal prisms is arranged in a vertical direction to the viewing direction in a line without having a gap.

4. The refractive optical screen of claim 1, wherein:
in the prism array,
a plurality of prisms for refracting first light beams incident in a first direction toward the viewing direction is arranged in a line while being spaced apart from each other by a predetermined gap, and
second light beams incident in a different direction from that of the first light beams straightly pass through the gap.

5. The refractive optical screen of claim 4, wherein:
in the prism array,
a plurality of micro trigonal prisms is regularly arranged in a vertical direction to the viewing direction while having the predetermined gap.

6. The refractive optical screen of claim 1, wherein:
in the prism array,
a plurality of micro trigonal prisms having different sizes and angles in consideration of a viewing angle of a viewer is regularly arranged in a vertical direction to the viewing direction.

7. The refractive optical screen of claim 6, wherein:
the prism array includes
a plurality of micro trigonal prisms having a prism size according to a pitch size calculated by using Cycles Per Degree (CPD) based on a Human Visual System (HVS) that is a value representing a human retina limit.

8. The refractive optical screen of claim 1, wherein:
the prism array includes
a plurality of first prisms which refracts first light beams incident in a first direction toward the viewing direction, and
a plurality of second prisms which refracts second light beams incident in a different direction from the first direction toward the viewing direction, and
the plurality of first prisms and the plurality of second prisms are arranged in a line while being spaced apart from each other by a predetermined gap, and
third light beams incident in a different direction from the directions of the first light beams and the second light beams straightly pass through the gap.

9. The refractive optical screen of claim 8, wherein:
the plurality of first prisms is
a micro trigonal prism having the same angle and size,
the plurality of second prisms is
a micro trigonal prism having a shape symmetric to a shape of the plurality of first prisms and having a predetermined angle and size, and
in the prism array,
the plurality of first prisms and the plurality of second prisms are regularly arranged in a structure symmetric based on a center of the viewing direction in a vertical direction to the viewing direction while having the same gap.

10. A floating hologram system, comprising:
a projector 1 which outputs a first image;
a projector 2 which outputs a second image;
a reflective screen 1 which is located in a direction diagonal to the projector 1 and reflects the first image;
a reflective screen 2 which is located in a direction diagonal to the projector 2 and reflects the second image; and
a refractive optical screen which is disposed at a location facing a viewing direction of a viewer, and refracts a plurality of first light beams toward the viewing direction when the plurality of first light beams reflected from the reflective screen 1 is incident, and refracts a plurality of second light beams toward the viewing direction when the plurality of second light beams reflected from the reflective screen 2 is incident, and
wherein the plurality of refracted first light beams forms a first virtual image in a hologram space, and the plurality of refracted second light beams forms a second virtual image in a hologram space,
wherein:
the refractive optical screen includes
a prism array in which a plurality of prisms including a first facet that is an optical plane refracting the first light beams toward the viewing direction and a second facet that is an optical plane refracting the second light beams incident in a different direction from a direction of the first light beams toward the viewing direction is continuously arranged
in a vertical direction to the viewing direction in a line, and
wherein:
the projector 1 and the reflective screen 2 are located in an upper portion of the hologram space, and the projector 2 and the reflective screen 1 are located in a lower portion of the hologram space, and
in the hologram space,
a floating hologram image, in which the second virtual image is a front image, and the first virtual image is a rear image, is output.

11. The floating hologram system of claim 10, wherein:
image points of an image reflected from each of the reflective screen 1 and the reflective screen 2 form virtual image points on an extension line having the same length with respect to a refractive surface of a prism, respectively, and
positions and angles of the virtual image points are changed according to an installation location and angle of each of the reflective screen 1 and the reflective screen 2.

\* \* \* \* \*